United States Patent [19]

Yabe et al.

[11] Patent Number: 5,175,043
[45] Date of Patent: Dec. 29, 1992

[54] AROMATIC POLYMER MOLDED ARTICLE WITH MODIFIED SURFACE CONDITION AND PROCESS FOR PRODUCING THE SAME

[75] Inventors: Akira Yabe; Hiroyuki Niino, both of Tsukuba; Shozaburo Nagano, Kodaira; Masahiro Hosoi, Tokyo; Takatoshi Kuratsuji, Matsuyama; Kazuaki Hotta, Yokohama; Masashi Nakano, Satte, all of Japan

[73] Assignees: Teijin Ltd.; Agency of Industrial Science; Kabushiki Kaisha DJK Res Center; NEC Corp., all of Japan

[21] Appl. No.: 392,929
[22] PCT Filed: Dec. 10, 1988
[86] PCT No.: PCT/JP88/01252
  § 371 Date: Jan. 7, 1991
  § 102(e) Date: Jan. 7, 1991
[87] PCT Pub. No.: WO89/05330
  PCT Pub. Date: Jun. 15, 1989

[30] Foreign Application Priority Data

Dec. 11, 1987 [JP] Japan ............... 62-312175
Dec. 11, 1987 [JP] Japan ............... 62-312176
Sep. 5, 1988 [JP] Japan ............... 63-220439
Nov. 7, 1988 [JP] Japan ............... 63-279475
Nov. 7, 1988 [JP] Japan ............... 63-279476

[51] Int. Cl.⁵ ............... B44C 1/22; B29C 37/00
[52] U.S. Cl. ............... 428/156; 156/643; 156/654; 156/668; 219/121.69; 428/212
[58] Field of Search ............ 156/643, 654, 668, 659.1; 250/492.1, 492.2, 492.3, 496.1; 264/22; 430/945; 427/53.1, 54.1; 219/121.67, 121.68, 121.69, 121.74, 121.75, 121.76, 121.77; 428/156, 212

[56] References Cited

U.S. PATENT DOCUMENTS 4,414,059 11/1983 Blum et al. ............... 156/659.1
4,417,948 11/1983 Mayne-Banton et al. ........ 156/643
4,568,632 2/1986 Blum et al. ............... 430/322

Primary Examiner—William A. Powell
Attorney, Agent, or Firm—Sherman and Shalloway

[57] ABSTRACT

The present invention lies in a process for modifying the surface of a molded article, which process comprises irradiating the surface of a molded article composed of an aromatic polymer or a polymer composition containing said aromatic polymer, with an ultraviolet laser beam having a wavelength of about 150 nm-380 nm at a fluence at least lower than the threshold to modify the surface as compared with the condition before the irradiation. The process makes it possible to modify the condition of the laser beam-irradiated surface portions of the molded article to, for example, a white color or black color, whereby the molded article can be endowed with functions and properties required in its use in various applications.

26 Claims, 3 Drawing Sheets

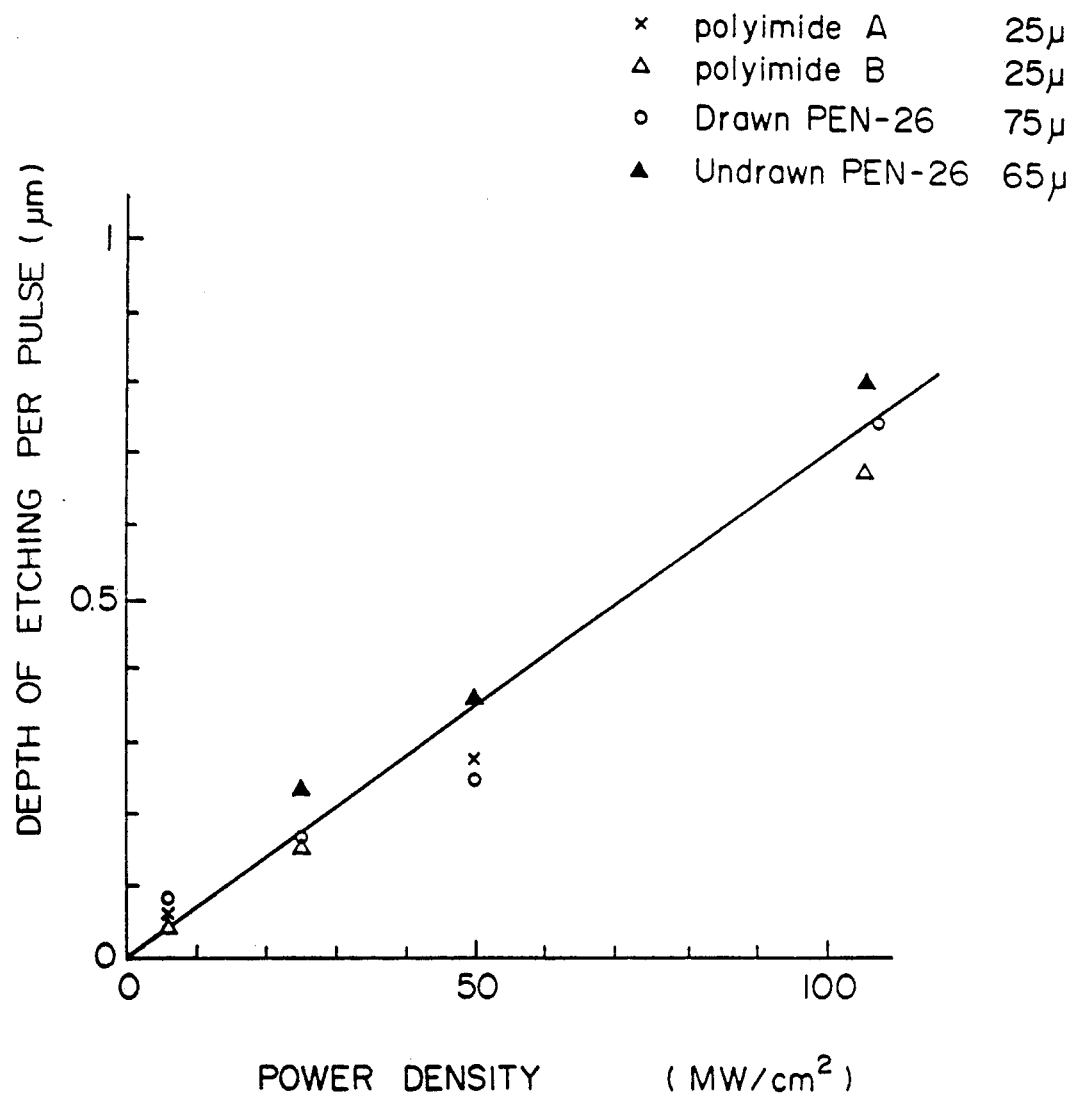

AROMATIC POLYMER MOLDED ARTICLE WITH MODIFIED SURFACE CONDITION AND PROCESS FOR PRODUCING THE SAME

TECHNICAL FIELD

The present invention relates to an aromatic polymer molded article with modified surface condition and a process for producing the same. More particularly, the present invention relates to the modification of the surface condition, particularly the color, adhesion, lubricity, drawability, etc. of the surface of an aromatic polymer molded article by the irradiation of the molded article with an ultraviolet laser beam under particular conditions.

BACKGROUND ART

As the technique for the modification of the surface condition of a polymer molded article, particularly a polymer film, there have been proposed many methods employing chemical or physical means. In particular, the use of a film as a recording material is rapidly growing recently, and the surface modification of such a film is a requisite and essential technique.

Meanwhile, the use of a high output ultraviolet laser such as excimer laser has recently been proposed as a means for the modification of a polymer molded article. Description is made below on typical literatures describing the use of such an ultraviolet laser.

(1) "Laser Research", Vol. 8. No. 6, 941 (1980):

This treatise entitled "Photoetching of PMMA by Excimer Laser" by Yoshiyuki Kawamura et al. describes the effect of the application of a KrF laser beam to a polymethyl methacrylate (PMMA) under different power densities and different fluences (energy densities), on the etching depth of the PMMA.

(2) Specification of U.S. Pat No. 4,247,496:

This patent describes a method for modifying the surface of a polypropylene film or a polyethylene terephthalate film by drawing the film after or simultaneously with the application of an ultraviolet light using an ultraviolet lamp. The patent describes that by a combination of the ultraviolet light application and the drawing, the film is improved in slipperiness, loses gloss, is improved in hygroscopicity and oil absorbability, and acquires drawability.

Therefore, the patent discloses a method for modifying the surface of a polypropylene film, a polyethylene terephthalate film or the like by a combination of drawing and ultraviolet light application under the above mentioned condition but makes no disclosure as to the method for modifying the surface of a film by ultraviolet light application alone.

(3) Appl. Phys. Lett. 43 (8) 717 (1983):

This treatise entitled "Direct etching of polymeric materials using a XeCl laser" by J. E. Andrew et al. describes that when a polyethylene terephthalate film is irradiated with a XeCl laser beam, the irradiated portion of the film is decomposed and etched. The treatise also describes that a polyimide and a photoresist are etched as well.

(4) IBM(T) Technical Disclosure Bulletin Vol. 26 No. 63049 (1983):

This treatise entitled "Archival Storage with UV Lasers" by S. E. Blum et al. describes that when a polymer is irradiated with a laser having a wavelength of 200 nm or less, the irradiated portions of the polymer momentarily cause ablation effectively and that the utilization of this ablative feature enables high density information recording in polymer material at a low fluence (energy density).

In this method, however, when a polymer material is irradiated with a laser at a fluence close to the threshold in order to cause ablation and enable information recording therein, the difference in reflectance between the irradiated and non-irradiated portions of the polymer material is not striking in spite of the occurrence of ablation. The enlargement of difference in reflectance requires the use of a laser beam having a higher energy density and a short wavelength of 200 nm or less. Thus, the above method has drawbacks.

(5) Laser Processing and Diagnostics, Proceedings of an International Conference, University of Linz, Austria, Jul. 15-19, 1984, pp. 343-353:

In this treatise entitled "Ultraviolet Laser Ablation of Organic Polymer Films", R. Srinivasan describes that when films of polymers such as polyethylene terephthalate, polyimide, polymethyl methacrylate and the like were irradiated with several ultraviolet laser beams of different wavelengths, etching was seen on the film surfaces.

The treatise describes that the ablation has a threshold and takes place only when the laser application is made at a fluence of certain given value or more. This "threshold" differs by the type of polymer irradiated and also by the type of laser used for irradiation. According to R. Srinivan et al., the threshold for, for example, polycarbonate is as follows.

| Type of U.V. laser (wavelength) | Threshold |
| --- | --- |
| XeCl (308 nm) | About 300 mJ/cm$^2$ |
| KrF (248 nm) | About 200 mJ/cm$^2$ |
| ArF (193 nm) | About 50 mJ/cm$^2$ |

From the above relation between wavelength and threshold in polycarbonate, it is appreciated that when a laser beam of long wavelength is applied in order to cause ablation, a high fluence is required.

(6) J. Phys. Chem. 1986, 90, 2124-2134:

This treatise by S. Lazare et al. describes that when a polyethylene terephthalate film is irradiated with an ArF excimer laser beam at a fluence of 100 mJ/cm$^2$ per pulse in air and the film surface is observed with a scanning type electron microscope, fine unevennesses are seen on the surface.

(7) Appl. Phys. 64 (1) 365 (1988)

This treatise entitled "Structural origin of surface morphological modification developed on poly (ethylene terephthalate) by excimer laser photoablation" by Y. Novis et al. describes the results of application of an ArF laser beam to undrawn and uniaxially drawn polyethylene terephthalate films.

According to the treatise, the surface of the undrawn film is etched uniformly with the transparency remaining, while on the surface of the uniaxially drawn film, there are formed unevennesses aligned in a direction perpendicular to the drawing direction. It is further described that the condition of surface etching is strikingly different between the amorphous film and the semicrystalline film and accordingly the surface etching by an ultraviolet laser beam provides a rapid and simple method for observation of the structure of a semicrystalline aromatic polymer.

(8) Specifications of U.S. Pat. Nos. 4,414,059, 4,417,948 and 4,568,632:

These U.S. patents propose a method for etching a film of a polymethyl methacrylate, a polyethylene terephthalate or a polyimide using an ultraviolet light having a wavelength of 220 nm or less.

In the above mentioned conventional techniques by irradiation of a polymer with an ultraviolet laser beam, the core of technique lies in the etching of a polymer molded article, and the polymer to be treated is an aliphatic polymer or a very restricted particular monocyclic aromatic polymer.

Hence, the present inventors made intensive research on the use of an ultraviolet laser beam to modify the surface of a polymer molded article and found interesting facts as shown below.

(a) It was found that even when an aromatic polymer molded article is irradiated with a laser beam having a longer wavelength than employed in the conventionally known techniques or at a lower fluence, the modification of the surface of the molded article, particularly its discoloration such as whitening or blackening takes place efficiently when the pulse frequency is increased. Under such condition of irradiation with an ultraviolet leaser beam, the surface of the polymer molded article causes discoloration at a fluence lower than the threshold.

That is, it was found that when the fluence is considerably lower than the threshold, the surface of the polymer molded articles is transparent but the irradiated site can be clearly observed with the naked eye and, when the fluence is increased, the surface whitens, and at a fluence slightly higher than that, the surface blackens, and the surface becomes white again when the fluence is made still higher.

It was found that the difference in color (e.g. surface reflectance) between the irradiated and discolored portions and the non-irradiated portions is very large. It was found moreover that the discoloration is difficult to peel off from the surface of the molded article and the change in surface reflectance differs only very slightly between different lights of different wavelengths used for reading-out and thus the irradiated molded article has characteristics which are very advantageous practically.

(b) When an ultraviolet laser beam is used in place of a discharge lamp such as mercury lamp, the surface of a molded article irradiated therewith is modified even without effecting drawing simultaneously with or after the irradiation. That is, a phenomenon was seen which was different from the description in the specification of U.S. Pat. No. 4,247,496 that the surface of a uniaxially or biaxially drawn molded article is modified when the surface is irradiated with an ultraviolet laser beam. The degree of the surface modification or discoloration can be adjusted or controlled by changing the irradiation conditions by an ultraviolet laser beam. In this case, more striking modification is seen by the use of a drawn molded article.

(c) It was found that a polymer having, in the recurring unit constituting the polymer, at least one polycyclic condensed aromatic ring or diphenyl ring such as naphthalene ring or anthracene ring can easily cause surface modification, i.e. etching even by using a discharge lamp of wavelength shorter than 380 nm (e.g. high pressure mercury lamp, xenon lamp, carbon arc), in place of using an ultraviolet laser of wavelength of 200 or less or a high output ultraviolet laser. That is, it was found that when an ultraviolet laser beam is used for irradiation of a polymer molded article, the molded article can be subjected to photoprocessing in a state that substantially no thermal history remains, even by using an ultraviolet laser beam of longer wavelength than employed in the conventional techniques.

The present invention has been reached based on the above findings and includes the following inventions.

1. A process for producing a molded article having a modified surface condition as a result of the irradiation with an ultraviolet laser beam, which process is characterized by irradiating the surface of a molded article composed of an aromatic polymer or a polymer composition containing said aromatic polymer
   (a) with an ultraviolet laser beam having a wavelength of about 150 nm–380 nm,
   (b) at a density of at least $10^4$ w/cm$^2$, and
   (c) at a fluence lower than the threshold.

2. A process for producing a molded article having an at least partially discolored surface as a result of the irradiation with an ultraviolet laser beam, which process is characterized by irradiating the surface of a molded article composed of an aromatic polymer or a polymer composition containing said aromatic polymer
   (a) with an ultraviolet laser beam having a wavelength or about 150 nm–380 nm,
   (b) at a density of at least $10^4$ w/cm$^2$,
   (c') at a fluence which is 300% or less of the threshold.
   (d) so that the surface portions irradiated with the ultraviolet laser beam are discolored.

3. A process for producing a molded article with a modified or etched surface, which process is characterized by irradiating the surface of a molded article composed of a linear polymer composition constituted by a recurring unit containing at least one polycyclic condensed aromatic ring or diphenyl ring, with an ultraviolet light having a wavelength of about 150 nm–about 380 nm.

4. A process for producing a polyethylene terephthalate molded article having a modified or discolored surface condition as a result of the irradiation with an ultraviolet laser beam, which process is characterized by irradiating the surface of a molded article of an at least uniaxially drawn polyethylene terephthalate
   (a') with an ultraviolet laser beam having a wavelength of 220 nm–380 nm,
   (b) at a density of at least $10^4$ w/cm$^2$, and
   (c) at a fluence lower than the threshold.

The present invention is described in more detail below.

In the present invention, the molded article to be irradiated with an ultraviolet laser beam is composed of an aromatic polymer or a composition containing said aromatic polymer, preferably of a composition containing an aromatic polymer in an amount of about 20% by weight or more, desirably about 50% by weight or more, particularly about 70% by weight or more.

The aromatic polymer refers to an aromatic polymer containing at least one aromatic ring in the monomer unit constituting the polymer when the monomer unit is one kind, or containing at least one aromatic ring in at least one monomer unit when the monomer units are two or more kinds. The aromatic ring is preferably an aromatic hydrocarbon ring of 6-14 carbon atoms such as benzene ring, naphthalene ring, anthracene ring or diphenyl ring.

As the bonding form of the aromatic polymer, there can be mentioned ester, amide, imide, ether, ketone, sulfone, sulfide, carbonate, epoxy or alkylene.

The molded article of the present invention preferably contains about 20% by weight or more of the aromatic polymer. The molded article may contain, besides, an aliphatic polymer and various additives. The aromatic polymer can be not only a single polymer but also a mixture of two or more polymers. Specific examples of the aromatic polymer are shown below:

(i) aromatic polyesters such as polyethylene terephthalate, polybutylene terephthalate and poly(ethylene-2,6-naphthalate); and poly(arylate)s composed of an aromatic dicarboxylic acid, bisphenol (A or S) and, optionally, a hydroxy aromatic carboxylic acid;

(ii) aromatic polyamides such as polymetaphenylene isophthalamide and paraphenylene isophthalamide;

(iii) aromatic polyimides composed of at least one aromatic tetracarboxylic acid dianhydride such as pyromellitic acid dianhydride, diphenyltetracarboxylic acid dianhydride or the like and at least one diamine such as hexamethylenediamine, xylylenediamine, phenylenediamine, 4,4'-diaminodiphenyl ether, 4,4'-diaminodiphenylsulfone, 4,4'-diaminodiphenylmethane or the like;

(iv) polyphenylene ether, polyphenylene sulfide, polyphenylene ether ether ketone, polyetherimide, polyphenylene sulfide; aromatic epoxy resins;

(v) bisphenol type polycarbonates;

(vi) polystyrenes;

The above aromatic polymers may be respective copolymers or mixtures with other polymers. For example, they may be a mixture of the above polycarbonate with a polystyrene.

Besides the above illustrated aromatic polymers, there are also included, in the scope of the aromatic polymer of the present invention, those polymers obtained by polymerizing styrene, methylstyrene, benzyl methacrylate, phenyl methacrylate or o-methylphenylmaleimide with methyl methacrylate and containing an aromatic ring-containing monomer in an amount of 20% by weight or more.

Preferably, the aromatic polymer is substantially linear. It can be in any of a crystal form, a semicrystal form and an amorphous form.

In the present invention, the molded article composed of a polymer composition containing an aromatic polymer can have any shape. However, the portion of the molded article to be irradiated with an ultraviolet laser beam is preferably planar. In general, the shape of the molded article is suitably a film, a sheet, a plate or a board each advantageously having a thickness of particularly about 1 $\mu$ to about 2 mm, preferably about 5 $\mu$ to about 1.5 mm. These film and sheet may be used as they are but also used as a laminated film with other film or sheet.

The film, sheet, plate or board may have been drawn or undrawn. When a drawn product is preferred, it may be a uniaxially drawn or biaxially drawn product.

In the present invention, the ultraviolet laser beam applied to the surface of the molded article has a wavelength of about 150 nm to about 380 nm, preferably about 180 nm to about 320 nm. The light source thereof can be not only a laser beam of single wavelength but also a beam of a plurality of wavelengths. As the density of the ultraviolet laser beam, there is used a power density of at least $10^4$ w/cm$^2$, preferably at least $10^5$ w/cm$^2$.

As the ultraviolet laser beam, there can be specifically used, for example, laser beams of $F_2$ laser, ArF laser, KrCl laser, KrF laser, XeCl laser, $N_2$ laser, XeF laser, dye laser, etc; laser beams emitted from high-frequency transformers such as copper vapor laser, YAG laser and the like; a laser beam emitted from a waveguide type excimer laser used as a light source for write-once type optical information recording, and a beam emitted from a high power discharge tube containing argon or xenon, capable of radiating a large capacity beam (e.g. 10–40 KJ/pulse) in a large area in a short time.

Meanwhile in the present invention, when the aromatic polymer is a linear polymer constituted by a recurring unit containing at least one polycyclic condensed aromatic ring or diphenyl ring, it is sufficient that the ultraviolet laser beam has a wavelength of about 150 nm to about 380 nm; the beam need not have a high power density and there can be used, for example, a high pressure mercury lamp, a carbon arc lamp, a mercury resonance lamp, etc. all of low power density.

In the present invention, the ultraviolet laser beam is applied onto the surface of the molded article at a power density of at least $10^4$ w/cm$^2$. At that time, the fluence of the beam is lower than the threshold.

The threshold is a value indicating a minimum fluence (J/cm$^2$.pulse) at which a molded article causes etching when the surface of the molded article has been irradiated with an ultraviolet laser beam, and it takes a given value when the wavelength of the beam and the type of the polymer in the molded article are selected.

In other embodiment of the present invention, when there is intended a molded article with an at least partially dicolored surface, an ultraviolet laser beam having a wavelength of about 150 nm to about 380 nm can be applied to a molded article at a density of at least of $10^4$ w/cm$^2$ at a fluence which is 300% or less of the threshold, to the extent that the irradiated portions of the molded article whiten or blacken.

In the irradiation of the molded article with an ultraviolet laser beam according to the present invention, when precise processing is required, it is possible to employ a technique, process or equipment of lithography such as photomask, aligner used for wafer exposure or the like. For example, a transparent plate or sheet (these are hereinafter referred to as "light-transmitting plate") is placed in tight contact with the surface of a molded article or at a very small distance (about 1 mm or less) from the surface; an ultraviolet laser beam is transmitted through the transparent plate or sheet; and by the transmitted beam, the surface of the molded article can be modified precisely.

The light-transmitting plate can be any plate as long as it is of a transparent material having a thickness of several $\mu$m to several mm and can transmit the large portion of a light applied. As the material of the light-transmitting plate, there can be used, for example, quartz, calcium fluoride, magnesium fluoride, lithium fluoride, a polyolefin, a polymethyl methacrylate or a poly(4-methylpentene-1). When an ultraviolet laser beam of long wavelength is applied, there can further be used, as the light-transmitting plate, a material which has substantially no absorbability for a light of long wavelength, such as glass, cellulose acetate or polystyrene.

When the light-transmitting plate is used in application of the ultraviolet laser beam, the surface modification, especially discoloration of the molded article is accelerated strikingly as compared with when no light-transmitting plate is used. It is difficult to theoretically explain this action of the light-transmitting plate, but the object of the present invention can be achieved very efficiently by the use of the light-transmitting plate-photomask.

As the light exposure method for irradiating the molded article with an ultraviolet laser beam, there are generally known a method in which light exposure is effected with a photomask placed in vacuum contact or soft contact with a work, and an exposure method by non-contact projection (proximity mode). In any of these methods, the surface modification and discoloration of the molded article can be accelerated by using a photomask as a light-transmitting plate.

In irradiating the surface of a molded article with an ultraviolet laser beam according to the present invention, the atmosphere can be any of "in air", "in an inert gas", "under vacuum" or "under pressure". In some cases, it is preferable to effect irradiation by ultraviolet laser beam at an elevated temperature to enhance the irradiation efficiency. As other means to enhance the efficiency of irradiation by ultraviolet laser beam, a method of adding a photosensitizer to a polymer composition beforehand is effective. As such a photosensitizer, there can be mentioned, for example, benzoin, pyrene, benzophenone, benzotriazole, dyes, etc.

The fluence as one condition of irradiation by ultraviolet laser beam is an important factor. An appropriate fluence (energy density) differs depending upon the purpose of the surface modification of the molded article.

For example, the irradiation conditions used when the surface of a film is modified from hydrophobicity to hydrophilicity are generally milder than the conditions used when the surface is discolored, as shown in Tables 1-3 of Example 1 which is described later. Meanwhile, when the purpose of the surface modification of a molded article is to modify the electrical or chemical properties of the surface, the power density and fluence of an ultraviolet laser beam used for irradiation of the molded article are important factors. The power density used in irradiation is appropriately $10^4$ w/cm$^2$–30 MW/cm$^2$, particularly $10^5$ w/cm$^2$–20 MW/cm$^2$. The fluence used in irradiation is 10% or more, preferably 20% or more of the threshold, and the upper limit is 300%, preferably 200%.

When the modification is effected to achieve discoloration, the irradiation conditions differ by the objective of the discoloration, i.e. blackening or whitening-and-devitrification. In the case of the former, high level blackening can often be obtained by controlling the power density and the fluence per pulse low within the above ranges and increasing the pulse frequency.

Meanwhile when the modification is effected to achieve whitening-and-devitrification in order to obtain a molded article having drawability, a good result can be obtained either by employing a fluence per pulse which is lower than employed when the modification is effected to achieve blackening, or by employing a fluence per pulse which is higher than employed when the modification is effected to achieve blackening.

As mentioned previously, the molded article of the present invention can take various shapes, for example, a film, a sheet, a disc, a fiber, etc. However, when the molded article is used as a recording layer of an information recording medium, a glass plate or a metal (e.g. aluminum) plate may be used as a substrate of the recording medium. In this case, a polymer composition is dissolved in an appropriate solvent, the resulting solution is coated on a substrate such as glass or the like, then the solvent is removed (evaporated), whereby a recording medium material comprising a substrate and a recording layer formed thereon can be prepared. In such a recording medium material, a metal an oxide, an organic compound or the like can be arranged on the recording layer or between the recording layer and the substrate, for amplification of reflection or protection of recording layer. However, in the most simple structure, there is used, as a substrate, a composition which is the same as the polymer composition constituting the molded article.

As mentioned previously, when the molded article is subjected to surface modification by ultraviolet laser beam according to the present invention, it is not necessary to draw the molded article simultaneously with or after the irradiation with the ultraviolet laser beam, and the surface modification can be effected only by the irradiation. In some cases, the effect of the irradiation is rather enhanced by subjecting the molded article to a preliminary treatment before the irradiation by ultraviolet laser beam. The drawing and orientation treatment of the molded article is a preferable example of the preliminary treatment. This drawing can be uniaxial or biaxial, and the biaxial drawing can be sequential biaxial or simultaneous biaxial. In the case of uniaxial drawing, the preferable draw ratio differs by the type of polymer composition, etc. but is about 2-5 times in the case of polyethylene terephthalate. In the case of biaxial drawing and orientation, the preferable areal draw ratio of polyethylene terephthalate is 5-20 times. The drawing temperature is 80°-160° C. in the case of polyethylene terephthalate and, after the drawing, there is ordinarily effected a heat treatment at 120°-240° C. The heat-treated molded article may then be used for irradiation, or, the heat treatment may be effected after irradiation. In some cases, the heat treatment may be omitted. As the preliminary treatment other than drawing, there is the formation of latent crystal nuclei in the molded article to be surface-modified, by heating the article to at least around its crystallization temperature.

It is also an effective example of the preliminary treatment to form crystal nuclei in the molded article by immersing the molded article in an appropriate solvent. For example, when the molded article is an amorphous polyethylene-2,6-naphthalate film, dioxane is used as the solvent and the molded article is immersed therein, for example, at about 50° C. for about 10 minutes, whereby crystal nuclei can be formed in the molded article.

According to the process of the present invention, the surface of a molded article can be modified electrically or discolored as mentioned above, and further can be modified in chemical and physical properties such as adhesion, friction coefficient and the like.

To enable the use of a high fluence, it is desirable to effect irradiation by using a convex lens and appropriately selecting the distance between light source and lens and the distance between lens and surface to be irradiated so that a desired fluence can be obtained at said surface. Meanwhile, to enable the use of a low fluence, it is sufficient to use a concave lens and appropriately select the above two distances.

EFFECTS OF THE INVENTION

The present invention enables the surface modification of various molded articles.

In the present invention, "modification" means the change of the surface of a molded article in physical and chemical properties, that is, it refers to the change of said surface in surface characteristics—wetting characteristic, adhesion, friction coefficient, weather resistance, fog resistance, hygroscopicity, oil absorbability, dyeability, conductivity, surface resistance, etc. by the irradiation with an ultraviolet laser beam. "Discoloration" includes the discoloration (blackening-whitening) of the surface of a molded article due to a photochemical reaction, as well as various changes of the surface in gloss, transparency, transmittance, surface reflectance, etc. all taking place in association with the discoloration.

When the polymer used in the present invention is applied to an optical recording medium, the resulting recording medium can be used as a write-once type recording medium and, moreover, it is possible to produce a large number of same recording media at a high efficiency by a projection type exposure method using a master mask. At that time, the following advantages can be obtained.

(1) Since an ultraviolet light of short wavelength is applied, a fine (submicron) pattern of high resolution can be obtained, that is, information recording can be effected at a high density.

(2) The fluence used in write or light exposure can be very low. Further, since the pattern formation is effected in an order of nanosecond, the light exposure or irradiation time is very short, making the productivity high.

(3) Read out can be effected with lights of wide range wavelengths. Further, since it is easy to obtain a difference in surface reflectance, of 30% or more between the irradiated portions and the non-irradiated portions, the error in read out becomes substantially zero.

(4) The recording medium (the irradiated polymer) has high weather resistance. Moreover, the medium has a very long life for storage of recorded information because the information recording therein is effected by applying a light substantially not contained in natural light, at a high power density.

Further, according to the present invention, a highly functionalized product can be obtained when an ultraviolet laser beam is applied to a molded article composed of a linear polymer composition constituted by a unit containing a polycyclic condensed aromatic ring or a diphenyl ring. An example of such a product includes a microporous film. Microporous films composed of various polymers are commercially available but, in these films, it is impossible to arrange the pores orderly and in a desired shape. According to the present invention, however, it is possible to easily form, in the polymer composition molded article, pores of desired shape orderly. The irradiation of the polymer composition molded article can also be applied to the cutting of the molded article; in this case, the cutting surface is not rough and a fine etched surface is formed.

EXAMPLES

Hereinafter, the present invention is explained by way of Examples and Comparative Examples. However, these Examples do not restrict the present invention in any way.

Incidentally, the surface reflectance shown in Examples is as follows.

Using a recording spectrophotometer UV-300 manufactured by Shimadzu Corp. to which an integrating sphere had been attached as an accessory apparatus, a reflectance of a sample after irradiation with a laser beam was evaluated by taking the reflectance of the sample before irradiation at 100%.

The following names of aromatic polymers used in Examples refer to specific polymers indicated below or to aromatic polymers having the following trade names of companies who manufactured said aromatic polymers.

Polyimide A (monocyclic aromatic)

Kapton manufactured by Du Pont.

Polyimide B (polycyclic condensed aromatic)

Polyimide composed of 3,3',4,4'-diphenyltetracarboxylic acid dianhydride and 4,4'-diaminodiphenyl ether. Upilex-R film (25μ) manufactured by Ube Industries, Ltd.

Polyimide C (polycyclic condensed aromatic)

Polyimide composed of 3,3',4,4'-diphenyltetracarboxylic acid dianhydride and paraphenylenediamine. Upilex-S film (25μ) manufactured by Ube Industires, Ltd.

Poly(arylate) A

Emplate u-1

Poly(arylate) B

Espex-R manufactured by SUMITOMO CHEMICAL CO. LTD.

Poly(ether sulfone) A

Stabar-S manufactured by ICI (VICTREX)

Poly(ether sulfone) B

Espex-S manufactured by SUMITOMO CHEMICAL CO., LTD.

PEEK

Polyphenylene ether ether ketone. "VICTREX$^R$" manufactured by ICI was used.

PPS

Polyphenylene sulfide. "GRO2" manufactured by Philips was used.

MPI

Polymetaphenylene isophthalamide.

PET

Polyethylene terephthalate.

PE-2,6

Polyethylene-2.6-naphthalate.

EXAMPLE 1

Photoprocessing of surface layer by XeCl laser beam

Using a XeCl laser beam (wavelength: 308 nm), sample films were directly irradiated at a power density of 0.6 MW/cm$^2$, at a fluence of 120 mJ/cm$^2$·pulse, at a repetition frequency of 10 Hz, at a pulse width (half-width) of 20 ns, and at a beam cross-sectional area of 5 mm×20 mm. Used in the irradiation were:
(1) Undrawn polyethylene 2,6-naphthalate film (hereinafter referred to as PEN-2,6 film) (65μ)
(2) Polyimide A film (25μ)
(3) Polyimide B and polyimide C films (25μ)

In general, read out of recorded information is effected by detecting the change in amout of the reflected light or transmitted light from a recording medium, by the light-receiving portion of a photodetector. Accordingly, in this test, discoloration (degree of blackening) when the number of radiation pulses of laser beam was changed up to 1,000 was measured by measuring the change in amount of transmitted light. That is, each of the irradiated samples was attached to a slit of 5 mm×10 mm and its transmittance was measured in a wavelength range of 400-800 nm. The numbers of pulses and the change in transmittance at 600 nm are shown in Table 1—1.

TABLE 1-1

Processing of surface layer by XeCl laser beam Numbers of radiation pulses and transmittances (%) at 600 nm

| Number of Pulses | Name of sample | | |
|---|---|---|---|
| | Undrawn PEN-2,6 | Polyimide B | Polyimide A |
| 0 (Blank) | 71.5 | 64.0 | 71.0 |
| 10 | — | 60.0 | 67.0 |
| 25 | 67.0 | — | — |
| 50 | 58.0 | 40.0 | 65.0 |
| 100 | 39.0 | 26.5 | 82.0 |
| 500 | 11.8 | 2.7 | 37.0 |
| 1000 | 6.0 | 2.0 | 21.0 |

As is clear from Table 1—1, the degree of blackening became striking gradually at a pulse number of 50 or more and the transmittance became very small at a pulse number of 100 or more. Further, the surface resistance of each irradiated sample was also measured. In the measurement of the surface resistance, there was used a simple surface resistance tester (TYPE 2755 manufactured by Yokogawa Hokushin Electric Corp.) and the electrode-to-electrode distance was taken at 10 mm. The results were shown in Table 1-2.

TABLE 1-2

Processing of surface layer by XeCl laser beam Numbers of radiation pulses and surface resistances (Ω)

| Number of Pulses | Name of sample | | |
|---|---|---|---|
| | Polyimide B | Polyimide C | Polyimide A |
| 100 | $5.0 \times 10^6$ | $5.0 \times 10^6$ | $5.4 \times 10^5$ |
| 250 | $2.1 \times 10^4$ | $9.1 \times 10^3$ | $5.0 \times 10^6$ |
| 500 | $6.1 \times 10^3$ | $5.8 \times 10^3$ | $1.1 \times 10^6$ |
| 750 | $4.3 \times 10^3$ | $6.9 \times 10^3$ | $1.8 \times 10^5$ |
| 1000 | $3.8 \times 10^3$ | $5.6 \times 10^3$ | $5.6 \times 10^4$ |

As is clear from Table 1-2, the surface resistance is strikingly low as a result of irradiation and the surface is modified. It is further clear that under the same irradiation conditions the surface layer of Upilex is far more easily modified than that of Kapton.

In the following table there are shown an example of surface modification causing no discoloration, conducted for biaxially drawn PEN-2,6 film (75μ).

The following yardstick by visual checking was used for evaluation of the surface modification causing no discoloration.

Upper limit pulse number: Upper limit of radiation pulse number at which no coloration is seen.
Lower limit pulse number: Minimum radiation pulse number at which the irradiated portions can be clearly distinguished from the non-irradiated portions.

In Table 1-3 there were shown the test results of surface modification by direct irradiation.

TABLE 1-3

Surface modification by XeCl laser beam Irradiation conditions and upper and lower limit pulse numbers for modification

| Test No. | Power density MW/cm² | Fluence mJ/cm² · pulse | Repetition frequency Hz | Number of pulses for modification | |
|---|---|---|---|---|---|
| | | | | Lower limit | Upper limit |
| X-2 | 0.6 | 120 | 10 | 1 | 10 |
| X-9 | 0.3 | 65 | 1 | 1 | 250 |

EXAMPLE 2

Photoprocessing of Surface Layer by KrF Laser Beam

Using a KrF laser beam (wavelength: 248 nm), the irradiation conditions giving the highest blackening were determined by using various irradiation conditions as shown in Table 2-1. In all tests, the pulse width (half-width) was 20 ns and the beam cross-sectional area was 5 mm×20 mm. In Test No. 9-4, a convex lens (focal length: 100 mm) was used to obtain a desired power density. In tests other than test No. 9-4, the irradiation was effected directly. Biaxially drawn PEN-2,6 film (1.5 μ) was used for irradiation.

TABLE 2-1

Processing of surface layer by KrF laser beam Irradiation conditions and blackening

| Test No. | Irradiation conditions by laser beam | | | Number of pulses giving no hole but striking blackening |
|---|---|---|---|---|
| | Power density MW/cm² | Fluence mJ/cm² · pulse | Repetition frequency Hz | |
| 1 | 0.5 | 42 | 10 | 500 |
| 2 | 0.8 | 65 | 10 | 50 |
| 9-1 | 1.0 | — | 10 | 50 |
| 3 | 1.3 | 95 | 10 | 25 |
| 4 | 1.5 | 120 | 10 | 10 |
| 5 | 0.5 | 42 | 1 | 500 |
| 6 | 1.5 | 120 | 1 | 25 |
| 9-4 | 10 | 120 | 10 | 5(Holes were formed without blackening.) |

As is clear from the above table, the number of pulses necessary for obtaining a given degree of coloring hardly changes even when the repetition frequency is varied. This conclusion was applicable even when the repetition frequency was increased up to 50 Hz in separate tests. However, when the power density is increased, striking coloring is seen even at small numbers of pulses.

Test No. 9-4 is a test under conditions for making holes in the PEN-2,6 film (1.5μ). It is clear that holes are formed in the film at a power density which is about 5 times that used in surface layer processing.

As one factor affecting the relationship between blackening and power density, there is a film thickness. In the biaxially drawn PEN-2,6 film, 0.3-3 MW/cm² is suitable for surface layer processing when the film thiskness is 1.5μ and 0.5-15 MW/cm² is suitable when the film thickness is 75μ. This is because when the film thickness is large, it is difficult to make holes in the film even at a high power density while it is easy to increase the degree of blackening and, therefore, the use of a high power density causes no problem practically.

EXAMPLE 3

Processing of Surface Layer by Excimer Laser Beam

In Examples 3-18, tests were conducted using, as an excimer laser EMG201MSC and EMG102MSC manufactured by Lamda Physics Co.

Using KrF (wavelength: 248 nm) as a gas medium, commercially available poly(imide)s, poly(arylate)s, poly(ether sulfone)s and PEN-2,6 were irradiated at the same irradiation conditions, i.e. a repetition frequency of 1 Hz, a pulse width (half-width) of 20 ns, a fluence per pulse of 35 mJ/cm² (pulse density of 0.176 MW/cm²) and a pulse number of 100.

The photoprocessability of each sample was evaluated by measuring the change in surface reflectance, of sample after irradiation.

The test results are shown in Table 3-1.

TABLE 3-1

Processing of surface layer by KrF laser beam (2) (Surface reflectance)

| Name of sample | Surface reflectance (%) | | | | Remarks |
|---|---|---|---|---|---|
| | 900 nm | 800 nm | 700 nm | 600 nm | |
| Undrawn PEN-2,6 | 20 | 20 | 15 | 15 | Blackening(deep) |
| Polyimide A | 40 | 35 | 35 | 30 | Blackening(slightly light) |
| Polyimide B | 45 | 40 | 40 | 35 | Blackening |
| Poly (arylate) A | 40 | 40 | 35 | 35 | Blackening |
| Poly (arylate) B | 35 | 35 | 30 | 30 | Blackening(slightly deep) |
| Poly (ether sulfone) A | 35 | 35 | 30 | 25 | Blackening(slightly deep) |
| Poly (ether sulfone) | 35 | 30 | 30 | 25 | Blackening(slightly deep) |

It became clear from Table 3-1 that in all of the polymers tested, the surface reflectance at the irradiated portions changed effectively at a very low fluence (energy density) and at a small pulse number.

Further, samples were irradiated under the same conditions as in Table 3-1 except that the gas medium was changed to XeCl (wavelength=308 nm) and the fluence per pulse was changed to 75 mJ/cm² (power density=0.375 MW/cm²), and the change in surface refletance of each sample was measured. The results as shown in the following table were obtained.

TABLE 3-2

Processing of surface layer by XeCl laser beam (2) (Surface reflectance)

| Name of sample | Surface reflectance (%) | | | | Remarks |
|---|---|---|---|---|---|
| | 900 nm | 800 nm | 700 nm | 600 nm | |
| Undrawn PEN-2,6 | 80 | 80 | 75 | 75 | Light whitening |
| Polyimide A | 95 | 95 | 95 | 90 | Light whitening and devitrification |
| Polyimide B | 85 | 85 | 85 | 85 | Light whitening |

It became clear that under the above irradiation conditions the surface reflectance of any sample caused no striking change.

EXAMPLE 4

Surface Modification (Whitening-blackening) By XeCl Laser Beam

Using XeCl (wavelength=308 nm) as a gas medium, samples were irradiated directly under the following conditions: repetition frequency=1 Hz, fluence=75 mJ/cm².pulse, and pulse width=20 ns (half-width). The irradiation was effected at pulse numbers up to 100, and the discoloration (whitening-blackening) of the surface of each sample was observed with the naked eye. Also, there was measured the surface reflectance of each sample after irradiation at a pulse number of 100. The results of the observation and the surface reflectance measurement were shown in Table 4-1. The samples used for irradiation were commercially available products except for PEN-2,6.

TABLE 4-1

Surface modification by XeCl laser beam

| Name of sample | surface reflectance (700 nm) | Observation of surface condition |
|---|---|---|
| PEN-2,6 (undrawn) | 75% | The surface caused light whitening |
| PEN-2,6 (uniaxially drawn to 2 times) | 55% | The surface caused blackening |
| PEN-2,6 (uniaxially drawn to 4 times) | 50% | The surface caused blackening |
| PEN-2,6 (biaxially drawn to 10 times)* | 60% | The surface caused blackening |
| PEEK (undrawn) | 55% | The surface caused light whitening |
| PEEK (biaxially drawn) | 30% | Deeply blackened overall |
| PPS (undrawn) | 20% | High blackening |
| PPS (biaxialy drawn) | 15% | Very high blackening |

*Areal ratio

It is clear from Table 4-1 that the drawn and orientated samples are more easily modified by irradiation.

The same irradiated samples of PEEK and PPS as in Table 4-1 were measured for reflectance at 900 nm-600 nm. The results were shown in Table 4-2.

TABLE 4-2

(Surface modification by XeCl laser beam)

| Name of sample | Surface reflectance (%) | | | |
|---|---|---|---|---|
| | 900 nm | 800 nm | 700 nm | 600 nm |
| PEEK (biaxially drawn) | 35 | 35 | 30 | 30 |
| PPS (biaxially drawn) | 20 | 15 | 15 | 15 |

As seen in Table 4-2, in the both samples, the reflectance at a shorter wavelength is smaller than that at a longer wavelength. However, the reflectance does not substantially change when the wavelength changes.

EXAMPLE 5

Surface Modification (Whitening-Blackening) by KrF Laser Beam

There was effected the same test as in Example 4 by changing the gas medium to KrF (wavelength=248 nm). The repetition frequency was 1 Hz; the pulse width was 20 ns (half-width); the number of radiation pulses was 100. The samples used for iradiation were all commercially available products except for a poly-m-phenylene isophthalamide film biaxially drawn to 10 times (areal ratio) (this film is hereinafter abbreviated to MPI).

TABLE 5-1

| | Surface modification by KrF laser beam (1) | | |
|---|---|---|---|
| | | Results of irradiation | |
| Name of sample | Fluence mJ/cm². pulse | Reflectance (%) 700 nm | observation of surface condition |
| PET(undrawn) | 35 | 30 | Slightly deep blackening |
| PET(biaxially drawn) | 35 | 25 | Slightly deep blackening |
| PET(biaxially drawn) | 80 | 90 | whitening and devitrification |
| MPI(biaxially drawn) | 35 | 45 | Slightly deep blackening |
| MPI(biaxially drawn) | 80 | 75 | Whitening and devitrification |
| PPS(undrawn) | 35 | 15 | Deep blackening |
| PPS(biaxially drawn) | 35 | 15 | Deep blackening |
| PPS(biaxially drawn) | 80 | 15 | Very deep blackening |

Whether the sample surface causes blackening or whitening-and-devitrification differs by the level of the fluence used. Taking the PET's as an example, both the undrawn sample and the biaxially drawn sample causes blackening at 35 mJ/cm².pulse, but the drawn and orientated sample after irradiation gives a lower reflectance. When the fluence is increased to 80 mJ/cm².pulse, however, the irradiated sample of the biaxially drawn PET causes whitening and devitrification at the surface. When the irradiated and devitrified surface was observed with an optical microscope, the suface had unevennesses and looked as if devitrified, owing to the diffused reflection. Whether the sample surface causes blackening or whitening-and-devitrification does not depend only on the fluence used, and differs also by the type of the polymer. For example, no whitening (devitrification) phenomenon is observed even at 80 mJ/cm².pulse in the case of the PPS.

When the sample surface whitens and is devitrified, the surface reflectance increases rapidly. However, having very fine unevennesses, the irradiated suface has a sufficient matte effect and expresses pencil drawability. Also, the irradiated suface clearly has improved absorbability for condenser insulating oil, etc. Further, it is possible to make more distinct the difference of optical properties (e.g. light transmittance and surface reflectance) between the irradiated suface portions and the non-irradiated surface portions, by utilizing the difference of dyeability by dyes between said different portions.

For reference, on samples whose surfaces had been blackened by irradiation, the surface resistance was measured using a simple surface resistance tester by setting the electron-to-electron distance at 10 mm. The results were shown in Table 5-2.

TABLE 5-2

| (Surface modification by KrF laser beam) | | |
|---|---|---|
| Name of sample | Fluence mJ/cm² · pulse | Surface resistance/ cm |
| PEEK(undrawn) | 0 | 10⁷ or more |
| PEEK(undrawn) | 35 | 2.4 × 10⁵ |
| PEEK(biaxially drawn) | 0 | 10⁷ or more |
| PEEK(biaxtally drawn) | 35 | 4.0 × 10⁶ |
| PPS(undrawn) | 0 | 10⁷ or more |
| PPS(undrawn) | 35 | 2.9 × 10⁵ |
| PPS(biaxially drawn) | 0 | 10⁷ or more |
| PPS(biaxially drawn) | 35 | 4.0 × 10⁵ |
| PPS(biaxially drawn) | 80 | 9.8 × 10⁵ |

In all the samples, the surface resistance was found to significantly decrease as a result of the irradiation.

EXAMPLE 6

Measurement of Change in Surface Reflectance

XeCl (wavelength=248 nm) was used as a gas medium for excimer laser. In all cases, the irradiation conditions were: repetition frequency=1 Hz, pulse width =20 ns (half-width), and pulse number=100.

Each sample was irradiated with a laser beam directly and not through a lens, and the change (whitening or blackening) of the sample surface was observed by measuring the surface reflectance.

The measurement results of reflectance and the observation results of discoloration were shown in Table 6-1 and Table 6-2. Incidentally, the fluence used for irradiation was 75 mJ/cm².pulse in the test of Table 6-1 and 35 mJ/cm².pulse in the test of Table 6-2.

In this Example and Example 7, the samples used for irradiation were all commercially available amorphous products.

TABLE 6-1

| | Surface modification by XeCl laser beam | | | | |
|---|---|---|---|---|---|
| Name of sample | Appearance of irradiated sample | Reflectance (%) | | | |
| | | 900 nm | 800 nm | 700 nm | 600 nm |
| PEEK | Blackening (slightly light) | 60 | 60 | 55 | 50 |
| PPS | Blackening (deep) | 25 | 25 | 20 | 20 |
| PET | Slightly yellow | — | — | — | — |

TABLE 6-2

| | Surface modification by KrF laser beam | | | | |
|---|---|---|---|---|---|
| Name of sample | Appearance of irradiated sample | Reflectance (%) | | | |
| | | 900 nm | 800 nm | 700 nm | 600 nm |
| PEEK | Blackening (slightly deep) | 35 | 35 | 30 | 30 |
| PPS | Blackening (deep) | 25 | 20 | 15 | 15 |
| PET | Blackening | 35 | 35 | 30 | 25 |

TABLE 6-2-continued

| | Surface modification by KrF laser beam | | | | |
|---|---|---|---|---|---|
| Name of sample | Appearance of irradiated sample | Reflectance (%) | | | |
| | | 900 nm | 800 nm | 700 nm | 600 nm |
| | (slightly deep) | | | | |

In all the samples, the surface reflectance was found to significantly change as a result of irradiation.

was arraged so that one half of the sample portion to be irradiated was covered by the plate and the other half of the portion was directly irradiated with a laser beam.

After each sample had been irradiated under given conditions, the irradiated sample was washed in a n-hexane solution using an ultrasonic wave for 10 seconds. The surface of each sample after washing was observed with the naked eye or a scanning type electron microscope.

TABLE 8

| | Photoprocessing using a light-transmitting plate | | | | | |
|---|---|---|---|---|---|---|
| | | | Irradiation conditions | | | Surface change of irradiated |
| Test No. | Light-transmitting plate used | name of sample used for irradiation | gas medium | Fluence mJ/cm² · pulse | Number of pulses | sample in portions covered by light-transmitting plate |
| 1 | Poly(4-methylpentene-1) | Undrawn PEN-2,6 | XeCl | 80 | 10 | Whitening and devitrification |
| 2 | Polystyrene(undrawn) | Undrawn PEN-2,6 | XeCl | 80 | 10 | Whitening and devitrification |
| 3 | Polypropylene | Undrawn PEN-2,6 | KrF | 40 | 10 | Whitening and devitrification |
| 4 | Polystyrene(undrawn) | Polysulfone | XeCl | 80 | 50 | Whitening and devitrification |
| 5 | Polystyrene(undrawn) | Polyetherimide | XeCl | 80 | 20 | Whitening and devitrification |
| 6 | Polystyrene(undrawn) | Aromatic epoxy resin plate (thickness: 3 mm) | XeCl | 200 | 50 | Whitening and devitrification |
| 7 | Adhesive tape* | Biaxially drawn PEN-2,6 | XeCl | 80 | 1 | Whitening and devitrification |
| 8 | Adhesive tape* | Biaxially drawn PEN-2,6 | XeCl | 80 | 10 | Whitening and devitrification |
| 9 | Quartz plate | Biaxially drawn PET | ArF | 80 | 10 | Whitening and devitrification |

*Scotch Tape ® manufactured by 3M Co. was used

EXAMPLE 7

Change in Surface Resistance

Using KrF (wavelength = 248 nm) as a gas medium, the same amorphous samples as in Example 6 were irradiated under the following conditions: repetition frequency = 1 Hz, pulse width = 20 ns (half-width), and number of radiation pulses = 100.

The change in surface resistance of each sample after irradiation was measured. The surface resistance was measured using a simple surface resistance tester (Model 2755 of Wheatstone's bridge type manufactured by YOKOGAWA HOKUSHIN ELECTRIC CORP.) by setting the electrode-to-electrode distance at 10 mm.

TABLE 7

| | Surface modification by KrF laser beam | |
|---|---|---|
| Name of sample | Fluence mJ/cm² · pulse | Surface resistance |
| PEEK | 0 | 10⁷ or more |
| | 35 | 10⁷ or more |
| PEEK | 0 | 10⁷ or more |
| | 35 | $2.4 \times 10^5$ |
| PPS | 0 | 10⁷ or more |
| | 35 | $2.9 \times 10^5$ |

It became clear that the samples other than the polyethylene terephthalate had a significantly reduced surface resistance as a result of irradiation.

EXAMPLE 8

Photoprocessing Using a Light-Transmitting Plate

The test was effected using a light-transmitting plate. The pulse width was 20 NS (half-width); the repetition frequency was 1 Hz; and the names of samples used for irradiation, light-transmitting plates, gas media of excimer laser, fluences and pulse numbers were shown in Table 8. The samples used for irradiation are films of 50 μm in thickness and, except for the polyethylene 2,6-naphthalate, are commercially available products.

As the light-transmitting plated, there were used commercially available films (thickness = 25-50 μm) except for quartz plate. Each light-transmitting plate As a result of the test, in all the samples, the surface portion irradiated through a light-transmitting plate caused whitening and devitrification, while the surface protion directly irradiated caused no change. Accordingly, it became clear that the use of a light-transmitting plate enables discoloration (whitening and devitrification) at a lower fluence or a smaller pulse number. It also became clear that a drawn sample, as compared with an undrawn sample causes whitening and devitrification under a weaker condition, even when a light-transmitting plate is used.

FIG. 1-a and FIG. 1-b show electron micrographs (magnification = 1,000) of Test No. 1 and Test No. 4, respectively. It was observed from these electron micrographs that whitening and devitrification has two types, i.e. a type wherein fine concaves are formed on the irradiated surface (left side of FIG. 1-a) and a type wherein the irradiated surface causes whitening and devitrification uniformly (left side of FIG. 1-b).

Test No. 9 uses ArF as a gas medium and PET (biaxially drawn) as a sample to be irradiated.

PET (biaxially drawn) has a threshold of 50 mJ/cm².pulse. In Test No. 9 (a reference example) using PET (biaxially drawn), it was examined whether or not a light-transmitting plate was effective even when irradiation was made at a fluence higher than the threshold. It became clear that in the test the surface portion not covered with the light-transmitting plate also caused whitening and devitrification but the surface portion covered with the light-transmitting plate caused a higher degree of whitening and devitrification and the light-transmitting plate had an effect.

EXAMPLE 9

Improvement of Lubricity

Using KrF (wavelength = 248 nm) as a gas medium of excimer laser, a biaxially drawn PET film was tested for modification of lubricity, at a repetition frequency of 1 Hz and a pulse width of 20 ns (half-width).

R. Srinivasan et al. report that the threshold for ablation of PET is as follows.

| | |
|---|---|
| XeCl (wavelength = 308 nm) | About 200 mJ/cm² |
| KrF (wavelength = 248 nm) | About 120 mJ/cm² |
| ArF (wavelength = 193 nm) | About 50 mJ/cm² |

[See R. Srinivasan et al., J. Polym. Sci. Polym. Chem. Ed. 22 2601 (1984).]

Whether or not PET was improved in lubricity after irradiation was evaluated by making the following measurements.

(1) Surface Roughness (Ra)

There was used a contact type surface roughness tester (SURFCODER SE-30C) manufactured by Kosaka kenkyusho. Surface roughness was expressed by Ra (unit = μm) which is a value defined by JIS B 0601-1976.

(2) Measurement of Lubricity (Frettability Between Two Irradiated Surfaces)

On a fixed metal bar (3 mm ϕ) is wound in one turn a test film with the irradiated surface exposed outside. On this film is superimposed another test film cut in a 8 mm width, at a wrapping angle of 90° so that the irradiated surfaces of the two test films come in contact with each other. A load (Ti) of 10 g is applied to the gravitational direction of the latter film. The film of 80 mm width was allowed to make a reciprocating movement in a horizontal direction. A force (T₂) acting in a horizontal direction at this time was detected, and a friction coefficient was calculated from the following formula.

$$\mu = \frac{1}{\theta} \ln \frac{T_2}{T_1}$$

(3) Measurement of Lubricity (Frettability Against Metal Pin)

On a fixed metal bar (3 mm ϕ) was superimposed a test film cut in a 8 mm width, at a wrapping angle of 90° so that the metal surface and the irradiated surface of the film came in contact with each other. T₂ was detected in the same manner as in (2) above, and a friction coefficient was calculated in the same manner using the above formula.

TABLE 9

(Modification of lubricity by irradiation with KrF laser beam)

| | | Measurements of lubircity | |
|---|---|---|---|
| Irradiation conditions | Surface roughness (Ra) | Frettability between two irradiated surfaces | Frettability against 3 mm metal pin |
| No irradiation | 0.003 μm | 0.28 | 0.28 |
| 40 mJ/cm² · pulse (10 pulses) | 0.013 μm | 0.37 | 0.18 |
| 180 mJ/cm² · pulse (50 pulses) | 0.38 μm | 0.40 | 0.16 |

As is clear from the above table, lubricity is deteriorated by irradiation when measured by fretting the two films (the irradiated surfaces of the films) against each other, while friction coefficient is decreased significantly and lubricity is improved when measured by fretting the irradiated film surface and the metal pin against each other.

It also became clear that when the irradiation condition was made severe, surface roughness became significantly large but lubricity did not show a large change proportionately to the change of surface roughness and sufficient modification can be obtained at a threshold or below.

EXAMPLE 10

Improvement of Wettability

Using XeCl (wavelength = 308 nm) as a gas medium of excimer laser, a biaxially drawn PEN-2,6 film was irradiated at a pulse interval of 1 Hz and a pulse width of 20 ns (half-width), whereby a test for wettability modification was effected. Prior to the test, a threshold of etching of the film was measured, which was 100 mJ/cm².

The following test pieces were used for the test.

(1) Test Piece of Irradiated Sample

This test piece was obtained by laminating two same films irradiated at a pulse number of 10 at a fluence of 80% of the threshold, so that the respective irradiated surfaces come in contact with each other.

(2) Test Piece of Comparative Sample

This test piece was obtained by laminating two same non-irradiated films. In preparation of each test piece, prior to the lamination, each film was thoroughly washed with chloroform to remove organic substances, etc. from the surfaces. The adhesive used for lamination and the lamination conditions are as follows.

(1) Adhesive; Vylon-30SS (trade name) namufactured by TOYOBO Co., LTD.

(2) Pretreatment for lamination; Each washed film was coated with an adhesive in a uniform thickness of 0.5 mm and dried for 2 hours in a room of 23° C. and 60% humidity.

(3) Heat seal; Two pretreated films were slowly laminated at their coated surfaces while applying a load of 5 kgf with a hot (100° C.) iron, to subject the films to heat seal in their length derection. Ironing was repeated 5 times to complete heat seal. The test pieces prepared as above were subjected to JIS-K-6854 T-peel test using an autograph Model DCS-5,000 manufactured by Shimadzu Corp., and peeling strength curves were prepared. By checking a variation in adhesion strength from the curve, the degree of improvement of wettability was examined.

Incidentally, the tensile speed of the autograph Model DCS-5,000 manufactured by Shimadxu Corp. was 200 mm/min.

TABLE 10

Improvement of wettability by irradiation with XeCl laser beam

| | Test piece | |
|---|---|---|
| Adhesion strength | two non-irradiated films | two irradiated films |
| Average value | 5.5 kgf/25 mm | 5.6 kgf/25 mm |
| Maximum value | 6.1 kgf/25 mm | 5.9 kgf/25 mm |
| Minimum value | 3.2 kgf/25 mm | 5.1 kgf/25 mm |

As is clear from the above table, the test piece obtained from the irradiated sample gives a very small variation between the maximum and minimum values of the peeling strength while the test piece obtained from the comparative sample gives a very large variation.

The adhesive surfaces after peeling were observed and shown schematically in FIG. 2. In the test piece obtained from the irradiated sample (FIG. 2-a), the adhesive remained uniformly on the both surfaces and caused adherent breakdown, while in the test piece of the non-irradiated sample (FIG. 2-b), peeling was seen at many places of the interface between the film and the adhesive.

From the above, it became clear that the wettability of film by adhesive is greatly improved by the irradiation with an excimer laser beam.

EXAMPLE 11

Modification of Surface Reflectance

Using ArF (wavelength = 193 nm) as a gas medium of excimer laser, there were irradiated the surfaces of plates [80 mm (length) × 50 mm (width) × 1.2 mm (thickness)] obtained by subjecting to injection molding a polycarbonate, a 80:20 (weight ratio) blend of a polyarylsulfone and a polystyrene, a polyarylsulfone and a polysulfone, whereby a test for modification of surface reflectance was effected.

The fluence used for irradiation was 40 mJ/cm$^2$·pulse (this corresponded to 80% to the threshold in the case of the polycarbonate), and the number of radiation pulses was 100. The polyarylsulfone used was RADEL-100 (trade name) of Amoco Chemicals Co., and commercially available products were used for other products. They were molded and then tested.

The results of photoprocessing were evaluated by measuring the change in surface reflectance.

TABLE 11

Modification of surface reflectance (%)
(ArF laser beam)

| Name of sample | Appearance after irradiation | Surface reflectance (%) | | | |
|---|---|---|---|---|---|
| | | 900 nm | 800 nm | 700 nm | 600 nm |
| Polycarbonate | Blackening (slightly deep) | 35 | 35 | 30 | 25 |
| Polycarbonate-polystyrene blend (80:20 wt. %) | Blackening (slightly deep) | 35 | 30 | 30 | 25 |
| Polyarylsulfone | Blackening (slightly deep) | 40 | 35 | 35 | 30 |
| Polysulfone | Blackening (deep) | 35 | 30 | 25 | 25 |

It became clear that when ArF is used as a gas medium, a low fluence is required but the irradiated surface can be descolored easily. when the fluence was increased to 80 mJ/cm$^2$·pulse (160% of the threshold in the case of the polycargbonate), all of the samples in the above table caused surface whitening and expressed drawability.

EXAMPLE 12

In this Example and Example 13, there were used, as a polycarbonate, "Teijin Panlite Film" (trade name) (thickness = 100 μm) manufactured by TEIJIN LTD. and, as polystyrenes, "Cellomer-S-2 Type" (transparent, undrawn, thickness = 25 μm) and "Cellomer-S Type" (transparent, biaxially drawn, thickness = 25 μm) manufactured by Ohkura Kogyo K.K.

Desired fluences were obtained by using XeCl (wavelength = 308 nm) as a gas medium of excimer laser and placing one or two convex lenses (f = 100 mm and 170 mm) between a sample to be irradiated and a light source. Using a polycarbonate film as a sample, a threshold at which ablation started was measured at a pulse interval of 1 Hz and a pulse width of 20 ns (half-width). From around 250 mJ/cm$^2$·pulse, ablation occurred with plasma luminescence and an impulse sound.

The fluence was increased; the laser beam was applied between 500 mJ/cm$^2$·pulse and 1,000 mJ/cm$^2$·pulse (200-400% of the threshold); and the change of surface condition of the sample was observed. As a result, while etching also occurred at all the fluences, coloring appeared on the irradiated surface of the sample from around 3 pulses and the irradiated portions changed to a slightly light black color at 5 pulses and to a fairly deep black color at 10 pulse. The degree of discoloration was approximately same at all the fluences.

In order to know the depth of etching per pulse, a polycarbonate film having a thickness of 100 μm was irradiated with a laser beam until a hole was formed. From the pulse number which was necessary to make the hole, the depth of etching per pulse was calculated. The results were as shown in Table 12.

TABLE 12

| Fluence mJ/cm$^2$ · pulse | Etching depth per pulse μm/pulse |
|---|---|
| 500 mJ/cm$^2$ (200% of threshold) | 0.45 |
| 750 mJ/cm$^2$ (300% of threshold) | 0.73 |
| 1,000 mJ/cm$^2$ (400% of threshold) | 0.99 |

The degree of discloration hardly changes even when the fluence is increased, as long as the evaluation is made with the naked eye. Thus, it became clear that no increase of fluence is required to obtain given discoloration (blackening).

A reference test was made under the same conditions as in Example 12 except that the fluence of excimer laser beam was reduced. As samples, there were used the above polycarbonate and polystyrenes (undrawn and biaxially drawn). Each sample was irradiated derectly with a laser beam at a fluence of 25 mJ/cm$^2$·pulse (this corresponded to 10% of the threshold in the case of the polycarbonate). In this test, no plasma luminescence was observed and there was no impulse sound, and the beam passed through each film sample. After the application of 100 pulses, the surface condition of each sample was observed with the naked eye, but no etching occurred and no trace of the irradiated portion could be detected.

It became clear that when XeCl is used as a gas medium, irradiation must be made at a slightly higher fluence or by adding a sensitizer.

EXAMPLE 13

A surface modification test was effected using, as gas media of excimer laser, KrF (wavelength = 248 nm) and ArF (wavelength = 193 nm) and, as sample, a polycarbonate and polystyrenes (undrawn and biaxially drawn). In all the cases, the irradiation conditions were: repetition frequency = 1 Hz, pulse width = 20 ns (half-width), and pulse number = 100 (KrF) or 50 (ArF). Each sample was irradiated directly using no lens, and the surface change was examined by measuring the surface reflectance. The results were shown in Table 13-1 and Table 13-2.

TABLE 13-1

Surface modification of polycarbonate by KrF laser beam (Change in surface reflectance)

| Fluence | Surface reflectance (%) | | | | Observation |
| --- | --- | --- | --- | --- | --- |
| | 900 nm | 800 nm | 700 nm | 600 nm | |
| 35 mJ/cm² · pulse* | 60 | 60 | 55 | 50 | Turned brown |

*Fluence which is 17.5% of the threshold

TABLE 13-2

Surface modification by ArF laser beam (change in surface reflectance)

| Name of sample | Fluence used for irradiation | Surface reflectance (%) | | | | Observation |
| --- | --- | --- | --- | --- | --- | --- |
| | | 900 nm | 800 nm | 700 nm | 600 nm | |
| Polycarbonate | 40 mJ/cm² · pulse*¹ | 60 | 60 | 55 | 50 | Slightly deep blackening |
| | 80 mJ/cm² · pulse*² | 95 | 95 | 90 | 85 | Whitening*³ |
| Polystyrene (undrawn) | 40 mJ/cm² · pulse | 60 | 60 | 65 | 60 | Slightly deep blackening |
| | 80 mJ/cm² · pulse | 70 | 70 | 65 | 60 | Slightly deep blackening |
| Polystyrene (biaxially drawn) | 40 mJ/cm² · pulse | 55 | 55 | 50 | 45 | Deep blackening |
| | 80 mJ/cm² · pulse | 50 | 50 | 45 | 40 | Deep blackening |

*¹Fluence which is 80% of the threshold.
*²Fluence which is 160% of the threshold.
*³Since the surface whitened, the difference in surface reflectance is not striking. However, the whitening could be clearly seen with the naked eye.

The appearance of each sample after irradiation was observed with the naked eye, but etching was hardly found at the irradiated portion of any sample. Thus, it is clear that when KrF or ArF is used as a gas medium and irradiation is made at a fluence which is 20% or more of the threshold, in such a state as no etching appears, there can be easily obtained a difference of surface reflectance of 30% or more between the irradiated portion and the non-irradiated portion.

From the test of polystyrenes in Table 13-2, it also became clear that when the undrawn sample and the biaxially drawn sample are compared, the biaxially drawn sample causes surface change more easily.

EXAMPLE 14

Photoprocessing by High Pressure Mercury Lamp

Biaxially drawn PEN-2,6 films of different thicknesses as shown in Table 14 were irradiatd with a high pressure mercury lamp (H400P 400 W manufactured by TOSHIBA CORP.) and then the change of each film thickness was measured.

This high pressure mercury lamp is characterized in that it emits a light having wavelengths of 546 nm, 436 nm, 570 nm, 402 nm, 313 nm, 302 nm and 209 nm and their realtive intensities become weaker in this order.

The distance between the mercury lamp and each film sample was 20 cm; the atmosphere was air; and the temperature was maintained at 50°-60° C.

TABLE 14

Test for etching by irradiation with high pressure mercury lamp (Biaxially drawn PEN-2,6 films)

| | Change of film thickness | | |
| --- | --- | --- | --- |
| Before test | 6.5μ | 11.4μ | 24.9μ |
| After irradiation of 100 hours | 4.1μ | 9.5μ | 23.2μ |
| Rate of etching | 240 Å/hr | 190 Å/hr | 160 Å/hr |

As a commercial technique for subjecting a plane to precision processing in a depth of about 1,000 Å in its vertical direction, there is precision injection molding. It is already established as a commercial process for production of compact discs and video discs, and these products are already available on the market in large quantities.

As shown in Table 14, when a discharge lamp of 400 W is used, the rate of etching in a direction vertical to a plane is slow at 160-240 Å/hr. However, discharge lamps of 3-6 KW or more are commercially available in the cases of Xenon short arc lamp, mercury short arc lamp, far ultraviolet lamp, ets.; therefore, PEN-2,6 can be subjected to photoprocessing under economical processing conditions, by approximately selecting one of the above lamps depending upon the purpose and further appropriately selecting photoprocessing conditions such as temperature, oxygen partial pressure and the like.

EXAMPLE 15

Photoprocessing by XeCl Excimer Laser Beam

A test for making a hole was effected by applying a XeCl laser beam (wavelength = 308 nm) to a sample through a stainless steel aperture having a square hole of 3 mm × 3 mm. The test was effected at a power density of 5.5 MW/cm² (a fluence of 1.4 J/cm².pulse after passing through the aperture), a pulse width of 25 ns (half-width), an irradiatin time of 110 ns and a repetition frequency (pulse interval) of 10 Hz, under such conditions that thermal process could by avoided to the utmost extent. Shown in Table 15 are the number of radiation pulses required for making a through-hole.

TABLE 15

Test for etching by XeCl laser beam

| Name of samples | Number of radiation pulses required for making a hole | Depth of etching per pulse |
| --- | --- | --- |
| Biaxially drawn PEN-2,6 film (6μ) | 200 | 0.03μ |
| Biaxially drawn PET film (4μ) | 2,500 | 0.0016μ |
| Poly(carbonate) film (25μ) | The surface caused only slight blackening after 5,000 pulses and showed no other change | |

Separately, irradiation by XeCl laser beam was effected for the purpose of modifying the surfaces of films. Samples were directly irradiated at a reduced power density of 0.6 MW/cm² (a fluence of 120 mJ/cm². pulse), a pulse width of 20 ns (half-width), a repetition frequency of 10 Hz and a beam cross-sectional area of 5 mm × 20 mm. The samples used were a biaxialy drawn PEN-2,6 film and a undrawn PEN-2,6 film.

This test was conducted by changing the number of radiation pulses up to 1,000. It was observed that as the pulse number increased, the irradiated surface blackened and then the black color deepened gradually. For information, the surface resistance of each sample was measured using a simple surface roughness tester with the electrode-to-electrode distance set at 10 mm. In each film, the surface resistance significantly decreased to $10^6 \Omega$ at a pulse number of 100 and $10^4 \Omega$ at a pulse number of 750.

EXAMPLE 16

Photoprocessing of Polyimide Film by Ultraviolet Light

As a light source, there was used a water-cooled special discharge lamp (1.5 KW) provided with a near ultraviolet-transmitting filter. Each film sample was placed on a turn table 150 mm apart from the light source and was irradiated with an ultraviolet light for 100 hours by maintaining the temperature at 80° C. or below. The thickness and elongation at break of each film after irradiation were measured and compared with those before irradiation.

The irradiation energy at the film surface was measured using an UV digital meter, which was $44 \pm 1$ mW/sec at 365 nm.

TABLE 16

Photoprocessing of polyimide film by ultraviolet light

| Name of sample | Thickness decrease of sample after irradiation | Retention of elongation at break after irradiation |
| --- | --- | --- |
| Biaxially drawn PEN-2,6 75μ | 0.8 μm | 76.6% |
| Polyimide A film (25μ) | No change | 70.6% |
| Polyimide B film (25μ) | 0.4 μm | 82.8% |

It became clear from Table 16 that the polyimide B between biphenyltetracarboxylic acid and a diamine, as compared with the polyimide A between benzenetetracarboxylic acid and a diamine, gives a large decrease in film thickness after irradiation and a large retention of elongation after irradiation.

EXAMPLE 17

Photoprocessing by KrF Excimer Laser Beam

It became clear that the polyimide B in Example 16 also is etched easily by a light. As the polyimide of this kind, there are available on the market two types which are said to differ in diamine component. (They are hereinafter abbreviated to polyimide C and polyimide B. Incidentally, the one used in Example 18 is polyimide B.)

These polyimides and a PEN-2,6 were used as samples. They were subjected to a test for making a hole using a KrF excimer laser beam.

The test was effected at a pulse width of 20 ns (half-width), an ordinary repetition frequency (pulse interval) of 1–20 Hz and a power density of 5–100 MW/cm². To obtain various desired power densities, a convex lens (focal length=100 mm) was used as necessary and the formation of apertaure hole image on sample surface was made through a stainless steel aperture having a square hole of 3 mm×3 mm.

By the test, there was determined a pulse number necessary for making a through-hole in each sample at a given power density and a given repetition frequency.

The test results are shown in FIG. 3. As a result, the following matters became clear.

(1) In irradiation by a discharge lamp, there was a striking difference in photoetching between the PEN-2,6 and the polyimide B. But in irradiation by a KrF laser, substantially no difference was seen.

(2) In each sample, there is a straight line relationship between the depth of etching per pulse and the power density.

(3) The pulse number necessary for making a through-hole hardly changes even by increasing the repetitio frequency (pulse interval) (there is little contribution of thermal processing).

BRIEF EXPLANATION OF THE DRAWINGS

FIG. 3 shows a relationship between depth of etching per pulse and power density, obtained in Example 17 of the present invention.

Figure 1A:
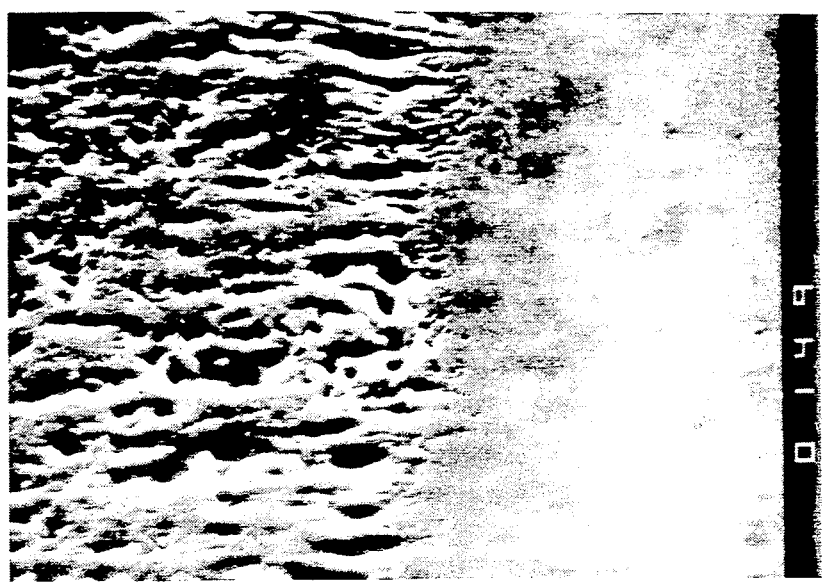
FIGS. 1a and 1b show scanning type electron micrographs of film surfaces after irradiation through a light-transmitting plate, obtained in Example 8 of the present invention.
Figure 1B:
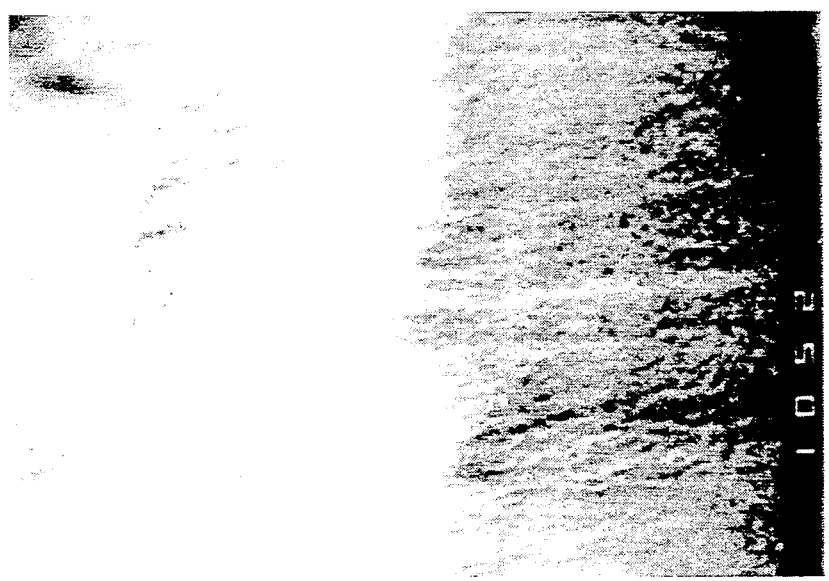
Figure 2A:
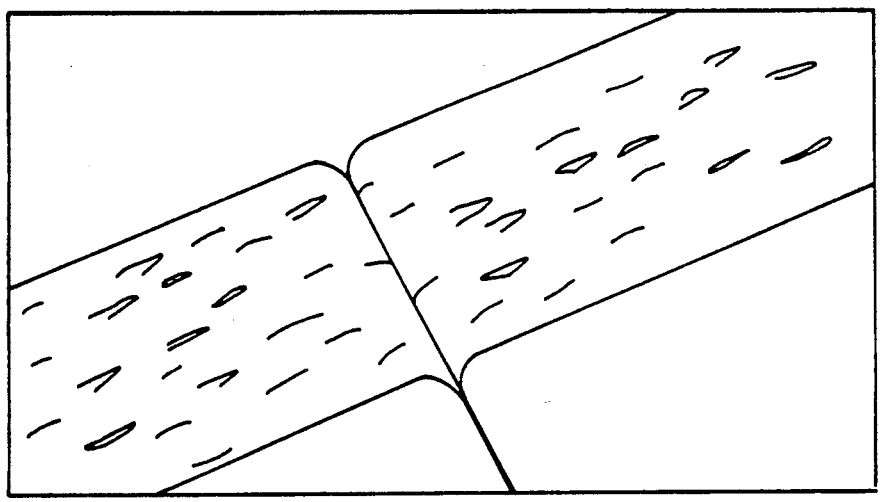
FIGS. 2a and 2b are schematic illustrations showing the conditions of surfaces after peeling, obtained in Example 10 (test for film lamination).
Figure 2B:
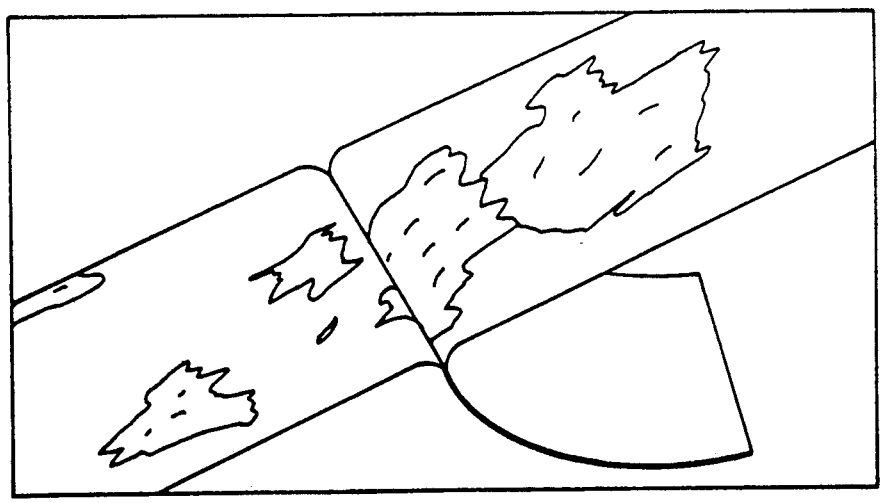

We claim:

1. A process for producing a molded article having a modified surface condition as a result of the irradiation with an ultraviolet laser beam, which process is characterized by irradiating the surface of a molded article composed of an aromatic polymer or a polymer composition containing said aromatic polymer
   (a) with an ultraviolet laser beam having a wavelength of about 150 nm–380 nm,
   (b) at a density of at least $10^4$ w/cm², and
   (c) at a fluence lower than the threshold.

2. A process for producing a molded article having an at least partially discolored surface as a result of the irradiation with an ultraviolet laser beam, which process is characterized by irradiating the surface of a molded article composed of an aromatic polymer or a polymer composition containing said aromatic polymer
   (a) with an ultraviolet laser beam having a wavelength of about 150 nm–380 nm,
   (b) at a density of at least $10^4$ w/cm²,
   (c') at a fluence which is 300% or less of the threshold,
   (d) so that the surface portions irradeated with the ultraviolet laser beam are discolored.

3. The process for producing a molded article, set forth in claim 1 or 2, wherein the polymer composition contains an aromatic polymer in an amount of 20% by weight or more.

4. The process for producing a molded article, set forth in claim 1 or 2, wherein the aromatic polymer is at least one member selected from the group consisting of an aromatic polyester, an aromatic polyether ether ketone, an aromatic polysulfone, an aromatic polysulfide, an aromatic polyethersulfone, a polyarylate, an aromatic polyimide, and aromatic polyamide, an aromatic polyetherimide, an aromatic polycarbonate and an aromatic epoxy resin.

5. The process for producing a molded article, set forth in claim 1 or 2, wherein the aromatic polymer is a substantially linear polymer.

6. The process for producing a molded article, set forth in claim 1 or 2, wherein the aromatic polymer has at least one aromatic hydrocarbon ring in the recurring unit.

7. The process for producing a molded article, set forth in claim 6, wherein the aromatic hydrocarbon ring is a benzene ring, a naphthalene ring, an anthracene ring or a diphenyl ring.

8. The process for producing a molded article, set forth in claim 6, wherein the aromatic hydrocarbon ring is a naphthalene ring, an anthracene ring or a diphenyl ring.

9. The process for producing a molded article, set forth in claim 1 or 2, wherein the aromatic polymer is an aromatic poly(ethersulfone) or a polyarylate.

10. The process for producing a molded article, set forth in claim 1 or 2, wherein a molded article composed of a composition containing an aromatic polymer of crystalline or semi-cryltalline form is subjected beforehand to the formation of latent crystal nuclei and then irradiated with an ultraviolet laser beam.

11. The process for producing a molded article, set forth in claim 1 or 2, wherein the aromatic polymer is an amorphous aromatic polymer.

12. The process for producing a molded article, set forth in claim 11, wherein the amorphous aromatic polymer is selected from the group consisting of a polyethylene terephthalate, a polyphenylene sulfide, an aromatic polyether ether ketone, an aromatic polyetherimide, an aromatic polysulfone and an aromatic epoxy resin.

13. The process for producing a molded article, set forth in claim 1 or 2, wherein the aromatic polymer is a mixture of an aromatic polycarbonate and a polystyrene.

14. The process for producing a molded article, set forth in claim 1 or 2, wherein the molded article is a film, a sheet, a plate or a board.

15. The process for producing a molded article, set forth in claim 1 or 2, wherein a light-transmitting plate is interposed between the surface of the molded article and a light source of the ultraviolet laser beam.

16. The process for producing a molded article, set forth in claim 15, wherein the light-transmitting plate has substantially no absorbability for the ultraviolet laser beam applied.

17. The process for producing a molded article, set forth in claim 15, wherein the light-transmitting plate is composed of one member selected from the group consisting of quartz, calcium fluoride, amgnesium fluoride, lithium fluoride, glass, a polyolefin, a polystyrene, a polymethyl methacrylate, a poly(4-methylpentene-1) and a cellulose acetate.

18. The process for producing a molded article, set forth in claim 15, wherein the light-transmitting plate is placed in tight contact with the molded article or at a distance of 1 mm or less from the molded article.

19. The process for producing a molded article, set forth in claim 15, wherein the light-transmitting plate is a photomask.

20. A molded article obtained by the production process of claim 1.

21. A molded article obtained by the production process of claim 2.

22. A method of recording information comprising
providing a molded article composed of an aromatic polymer or a polymer composition containing said aromatic polyer as a recording materials;
irradiating a surface of said molded article
  (a) with an ultraviolet laser beam having a wavelength of about 150 nm–380 nm,
  (b) at a density of at least $10^4 w/cm^2$, and
  (c) at a fluence lower than the threshold to form a predetermined pattern thereon.

23. A method of recording information comprising
providing a molded article composed of an aromatic polymer or a polymer composition containing said aromatic polymer as a recording material;
irradiating a surface of said molded article
  (a) with an ultraviolet laser beam having a wavelength of about 150 nm–380 nm,
  (b) at a density of at least $10^4 w/cm^2$,
  (c) at a fluence which is 300% or less of the threshold, and
  (d) so that the surface portions irradiated with the ultraviolet laser beam are discolored to form a predetermined pattern thereon.

24. A process for producing a molded article with a modified or etched surface, which process is characterized by irradiating the surface of a molded article composed of a linear polymer composition constituted by a recurring unit containing at least one polycyclic condensed aromatic ring or diphenyl ring, with an ultraviolet light having a wavelength of about 150 nm–about 380 nm.

25. A process for producing a polyethylene terephthalate molded article having a modified or discolored surface condition as a result of the irradiation with an ultraviolet laser beam, which process is characterized by irradiating the surface of a molded article of an at least uniaxially drawn polyethylene terephthalate
  (a') with an ultraviolet laser beam having a wavelength of 220 nm–380 nm,
  (b) at a density of at least $10^4 w/cm^2$, and
  (c) at a fluence lower than the threshold.

26. The process for producing a molded article, set forth in claim 1 or 2, wherein the aromatic polymer is an aromatic polycarbonate or a polystyrene.

* * * * *